(12) United States Patent
Symons et al.

(10) Patent No.: US 12,718,217 B2
(45) Date of Patent: Aug. 25, 2026

(54) POINT-OF-SALE SYSTEM FOR PORTABLE ELECTRONIC DEVICES

(71) Applicant: InVue Security Products Inc., Charlotte, NC (US)

(72) Inventors: Daniel C. Symons, Waxhaw, NC (US); John Johnson, Charlotte, NC (US); Dan Poon, Charlotte, NC (US); Christopher Richard Helman, Charlotte, NC (US); Tony Plunk, Charlotte, NC (US)

( * ) Notice: Subject to any disclaimer, the term of this patent is extended or adjusted under 35 U.S.C. 154(b) by 374 days.

(21) Appl. No.: 18/681,373

(22) PCT Filed: Aug. 5, 2022

(86) PCT No.: PCT/US2022/039590

§ 371 (c)(1),
(2) Date: Feb. 5, 2024

(87) PCT Pub. No.: WO2023/014980

PCT Pub. Date: Feb. 9, 2023

(65) Prior Publication Data

US 2026/0162092 A1 Jun. 11, 2026

Related U.S. Application Data

(60) Provisional application No. 63/230,385, filed on Aug. 6, 2021.

(51) Int. Cl.
*G06Q 20/20* (2012.01)

(52) U.S. Cl.
CPC .................................. *G06Q 20/202* (2013.01)

(58) Field of Classification Search
CPC .................................................... G06Q 20/202
See application file for complete search history.

(56) References Cited

U.S. PATENT DOCUMENTS

2018/0091183 A1* 3/2018 Basak .................. H04B 1/3888
2022/0154874 A1 5/2022 Phillips et al.

FOREIGN PATENT DOCUMENTS

CN 105006081 * 8/2015
CN 105006081 A 10/2015
FR 2968434 A1 7/2016

(Continued)

OTHER PUBLICATIONS

International Search Report and Written Option from corresponding International Application No. PCT/US2022/039590, dated Oct. 28, 2022.

*Primary Examiner* — Florian M Zeender
*Assistant Examiner* — Kimberly S. Bursum
(74) *Attorney, Agent, or Firm* — Dority & Manning, P.A.

(57) ABSTRACT

A point of sale system is provided. The point of sale system comprises a portable electronic device and a first shroud configured to be coupled to the portable electronic device. The system also includes a point of sale device configured to communicate with the portable electronic device, and a second shroud configured to be coupled to the point of sale device. The first shroud is configured to be removably attached to the first shroud to facilitate communication between the portable electronic device and the point of sale device, and the first shroud is configured to move relative to the second shroud while removably attached thereto.

21 Claims, 5 Drawing Sheets

(56) References Cited

FOREIGN PATENT DOCUMENTS

| | | | | |
|---|---|---|---|---|
| GB | 2527772 | A | 1/2016 | |
| GB | 2532706 | A | 1/2016 | |
| JP | 3658555 | B2 | 6/2005 | |
| WO | WO-2018032002 | A1 * | 2/2018 | ............. H02J 7/751 |

* cited by examiner

POINT-OF-SALE SYSTEM FOR PORTABLE ELECTRONIC DEVICES

CROSS REFERENCE TO RELATED APPLICATIONS

This application is a 371 National Stage entry of International Application No. PCT/US2022/039590, filed on Aug. 5, 2022 claims the benefit of priority to U.S. Provisional Application No. 63/230,385 filed on Aug. 6, 2021, the entire disclosure of which is incorporated herein by reference.

FIELD OF THE INVENTION

Embodiments of the present invention relate generally to point of sale devices, systems, docks, and methods for displaying portable electronic devices.

BACKGROUND OF THE INVENTION

A recent trend in work and retail store environments is to use smart devices, sometimes cellphones, but more often tablets, as customer service devices. This usage takes on two forms. One form is using a tablet as a kiosk where customers can interact with the device. This may be used to deliver information about the establishment or its products to the consumer, or to act as an interface for customer loyalty programs in lieu of plastic cards. A second usage is for retail store associates to carry such a device around the store to assist customers. The associate may use the device to display a layout of the store to show a customer where an item is, check on a price of an item, or access information regarding a product the customer is buying. In some stores, phones or tablets are being used to check-out customers. Restaurants may use smart devices at a table for ordering or game playing. Hospitals may allow doctors and nurses to carry smart devices for mobile access to patient health charts.

BRIEF SUMMARY

Embodiments of the present invention are directed towards point of sale systems and methods. In one embodiment, the point of sale system comprises a portable electronic device and a first shroud configured to be coupled to the portable electronic device. The system also includes a point of sale device configured to communicate with the portable electronic device, and a second shroud configured to be coupled to the point of sale device. The first shroud is configured to be removably attached to the first shroud to facilitate communication between the portable electronic device and the point of sale device, and the first shroud is configured to move relative to the second shroud while removably attached thereto.

In another embodiment, a point of sale system comprises a portable electronic device comprising a camera and a first shroud configured to be coupled to the portable electronic device. The system also includes a point of sale device configured to communicate with the portable electronic device and a second shroud configured to be coupled to the point of sale device. The first shroud is configured to be removably attached to the second shroud, and the first shroud is configured to move relative to the second shroud between a first position where the camera is inaccessible and a second position where the camera is accessible while the first and second shrouds are removably attached to one another.

In another embodiment, a point of sale system comprises a first shroud configured to be coupled to a portable electronic device and a second shroud configured to be coupled to a point of sale device configured to communicate with the portable electronic device. The first shroud is configured to be removably attached to the second shroud to facilitate communication between the portable electronic device and the point of sale device, and the first shroud is configured to move relative to the second shroud while removably attached thereto.

In another embodiment, a method comprises coupling a portable electronic device to a first shroud and coupling a second shroud to a point of sale device. The method further includes removably attaching the first shroud to the second shroud to facilitate communication between the portable electronic device and the point of sale device and moving the first shroud relative to the second shroud while removably attached to one another.

DETAILED DESCRIPTION OF EMBODIMENTS OF THE INVENTION

Figure 1:
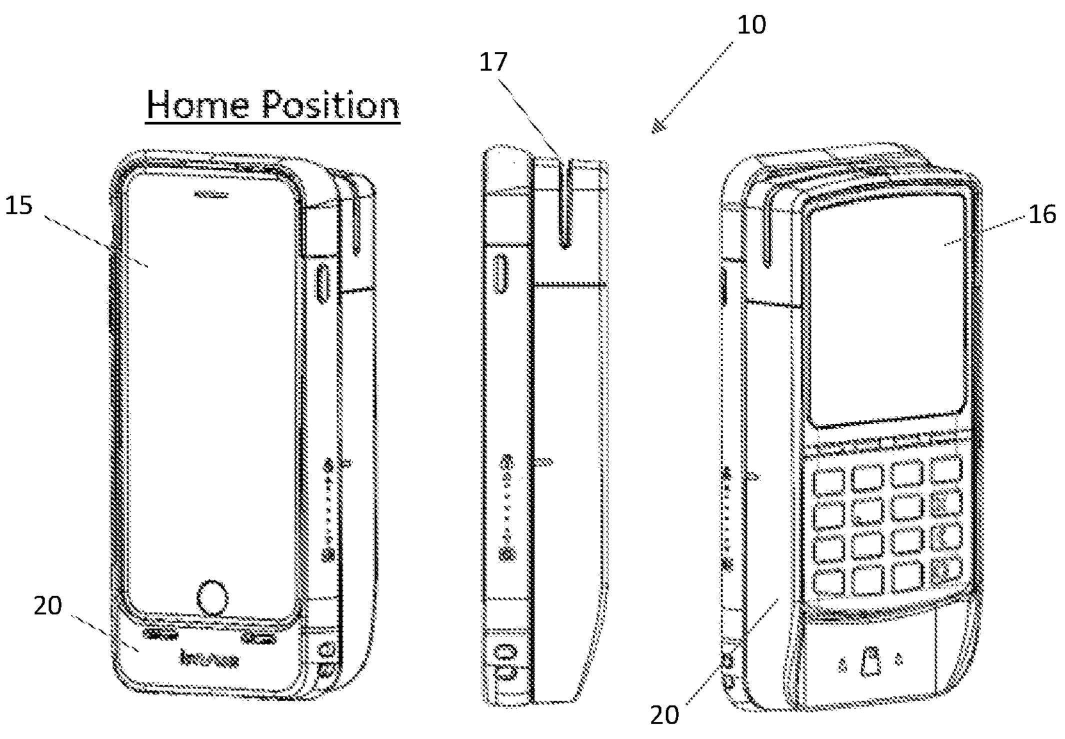
FIG. 1 illustrates different views of a point of sale system in a first position according to one embodiment.

Reference will now be made to the accompanying drawing figures wherein identical reference numerals denote the same or similar parts, elements, components, assemblies, subassemblies or the like throughout the various views. The attached drawing figures show exemplary embodiments of a point of sale or "POS" system 10 for a portable electronic device 15, for example, a phone, tablet, and/or a point-of-sale device. As used herein, the term "portable electronic device" is intended to include without limitation all types of portable, personal computers, for example, smartphones, tablets, laptop, notebook, mini-notebook, sub-notebook and netbook type computers, as well as personal data assistant (PDA) and personal mobile communications (e.g., cell phone) type devices. As used herein, the term "point of sale" or "POS" device is intended to include without limitation various forms of devices for completing a transaction, such as a card reader, chip card reader, magnetic stripe reader, EMV reader, or the like. The POS system 10 may be suitable, for example, for use by customers or employees, such as a retail store associate, a teacher, a nurse, a doctor, a maintenance worker, or an airline pilot/attendant, in a variety of locations and environments.

FIGS. 1-4 show a portable electronic device 15, and in particular a cellular phone, and a point of sale device 16 for use with a POS system 10 according to one embodiment of the invention. In one embodiment, the POS system 10 includes a shroud 20, frame, sleeve, or the like that is configured to be attached to a respective portable electronic device 15 and/or point of sale device 16. The shroud 20 is configured to be coupled to the portable electronic device 15 or point of sale device 16 and in some instances, at least partially receive and surround the portable electronic device or the point of sale device. For instance, the shroud 20 may be configured to surround the outer edges of the point of sale device 15 or POS device and in some cases also cover the rear surface of the portable electronic device or the POS device. The shroud 20 may be a rigid or semi-rigid plastic in some cases. Thus, either or both of the portable electronic device 15 and the point of sale device 16 may include a shroud 20. In the illustrated embodiments, both the portable electronic device 15 and the POS device 16 include a respective shroud 20. In one example, the shroud 20 of the POS device 16 may include a card slot 17 configured to align with a card slot provided on the POS device (e.g., for sliding or inserting a credit card).

Figure 4:
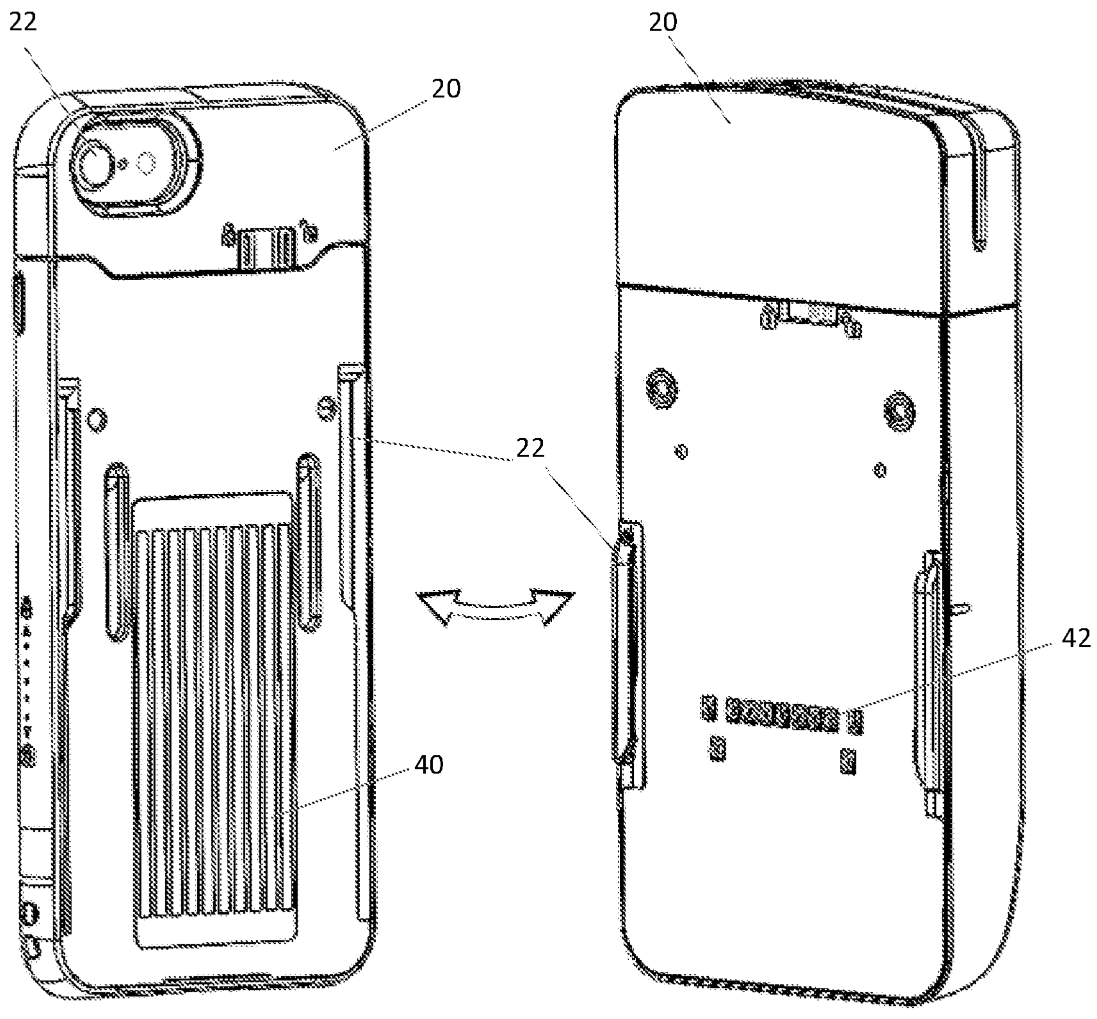
FIG. 4 is a perspective view of the point of sale system shown in FIG. 1 with the first shroud detached from the second shroud.

In some embodiments, the shrouds 20 may be configured to be removably attached to one another. In some cases, a rear surface of each of the shrouds 20 is configured to attach to one another such that each of the portable electronic device 15 and POS device 16 are usable when attached to one another. For example, the shrouds 20 may include one or more engagement members 22 that are configured to align with and engage one other. FIG. 4 shows an embodiment where the engagement members 22 are a pair of complementary rails and slots, where the slots are configured to receive the rails and guide the rails between engaged and disengaged positions. Thus, the shrouds 20 may be configured to slide between engaged and disengaged positions. The shrouds 20 may also include one or more detents to aid in positioning the portable electronic device and the POS device in predetermined positions relative to one another (e.g., the home position as described below). In some cases, the shrouds 20 may also or alternatively include one or magnets and/or magnetically attractable material to facilitate alignment and engagement with one another, including at predetermined positions. As shown in the illustrated examples, the shrouds 20 may be configured to attach to one another such that the portable electronic device 15 and the POS device 16 face in opposite directions to one another. In some advantageous embodiments, different shrouds 20 are configured to be swapped with one another such as for different sizes, makes, and/or models of the portable electronic device 15 and/or the POS device 16. For instance, a portable electronic device 15 and associated shroud 20 may be configured to attach to and operate with a plurality of different types of POS devices 16 and associated shrouds. Similarly, a POS device 16 and associated shroud 20 may be configured to attach to and operate with a plurality of different types of portable electronic devices 15 and associated shrouds.

Figure 2:
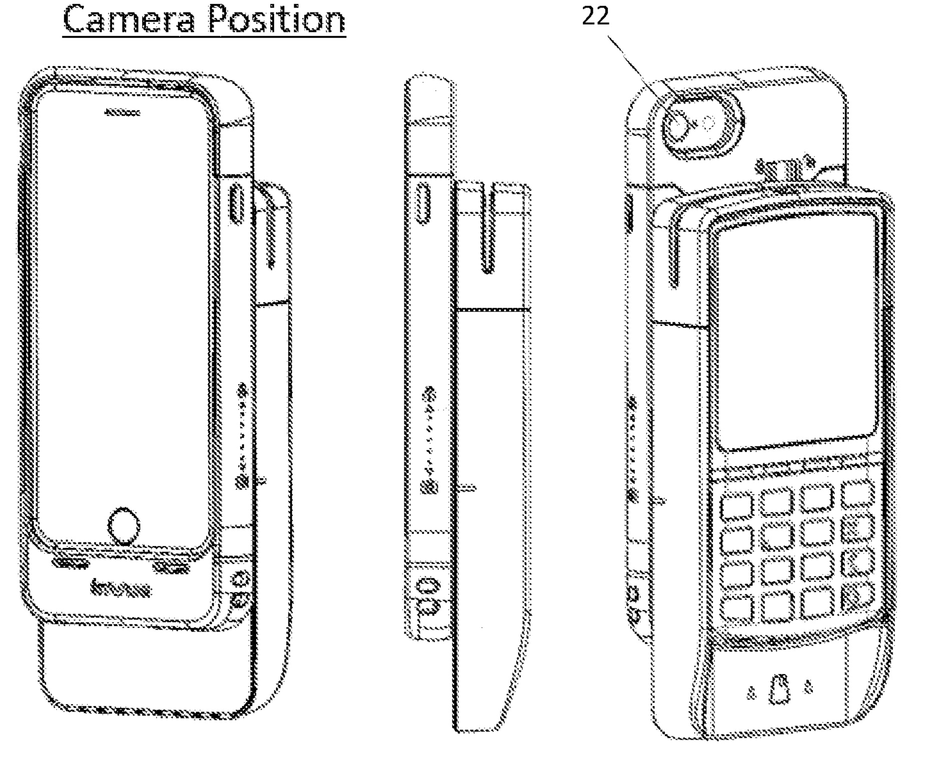
FIG. 2 illustrates different views of the point of sale system shown in FIG. 1 in a second position according to one embodiment.

A comparison of FIGS. 1 and 2 shows that the shrouds 20 may be configured to move between a first position (e.g., a "home" position) and a second position (e.g., a "camera" position). In other words, the shrouds 20 may be configured to move between the home position where a camera of the portable electronic device 15 is at least partially not visible or otherwise accessible and the camera position where the camera is visible and accessible, such as to use the portable electronic device to scan a UPC, QR, barcode, or other identifier. In this way, the shrouds 20 are configured to move between the home and camera positions while still maintaining mechanical engagement with one another. In the home position, the portable electronic device 15 and the POS device 16 are arranged as compactly as possible relative to one another, and the camera is only accessed as needed. In some cases, the home position may be a position located between a position where the shrouds 20 are able to initially engage one another via engagement members 22 and the camera position. It is understood that the second position should not be limited to a "camera position", as the second position may correspond to any desired position to facilitate use of the portable electronic device 15 and/or the POS device 16, such as for accessing various types of accessories, input devices, connections, ports, or the like of the portable electronic device or the POS device. As discussed in further detail below, the shrouds 20 may further facilitate and maintain an electrical connection therebetween in both of the home and camera positions as well as while moving between these positions.

Figure 3:
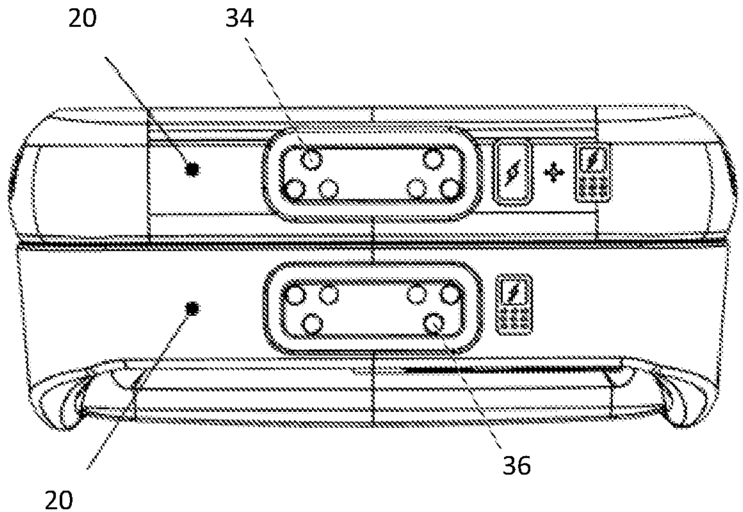
FIG. 3 is an end view of the point of sale system shown in FIG. 1.
Figure 5:
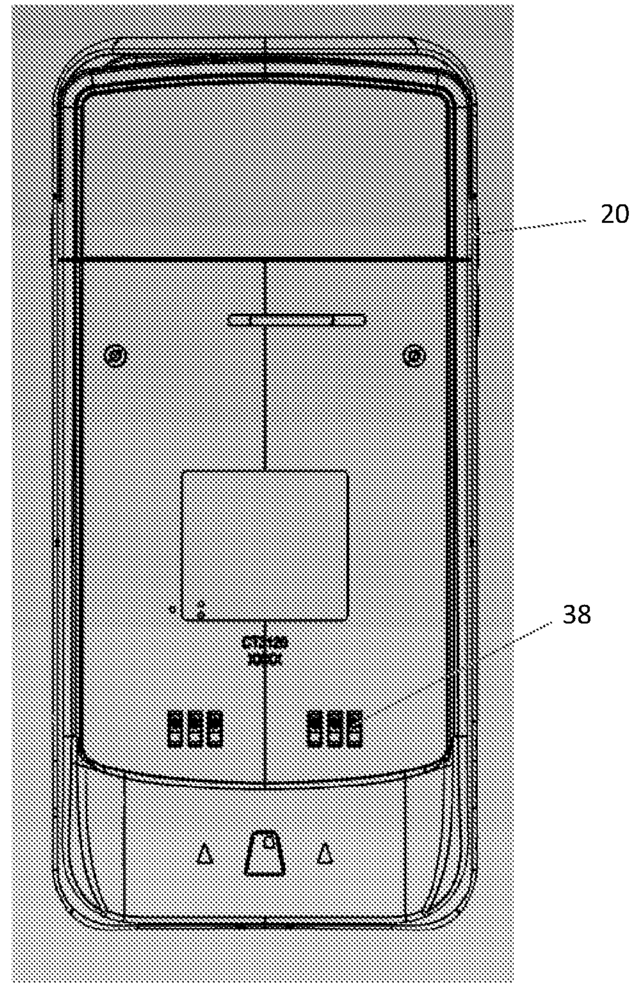
FIG. 5 is an elevation view of a shroud for a point of sale device according to one embodiment.
Figure 6:
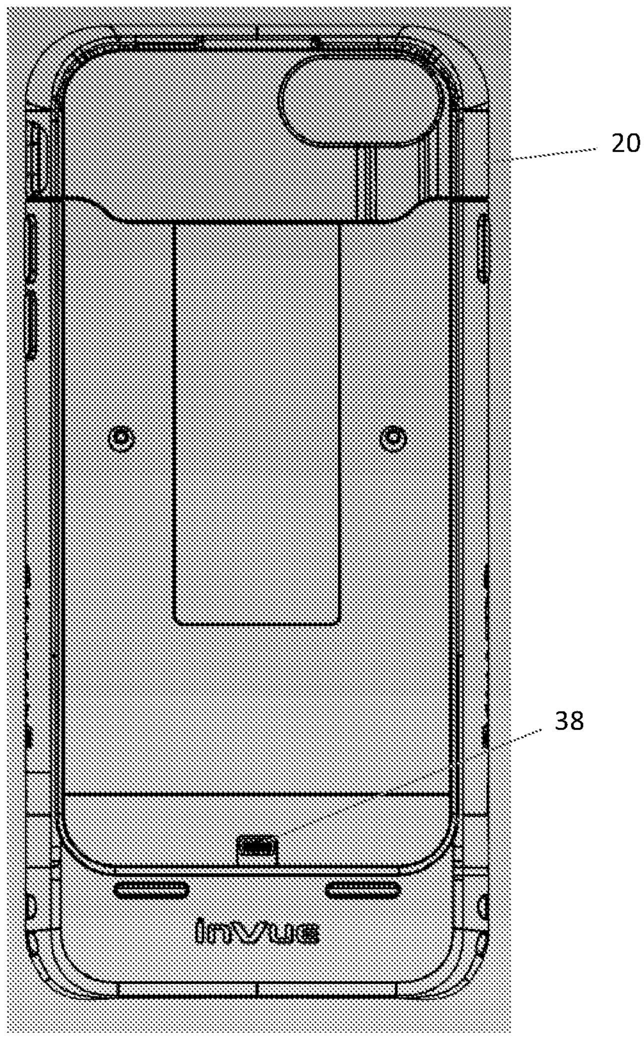
FIG. 6 is an elevation view of a shroud for a portable electronic device according to one embodiment.
Figure 7:
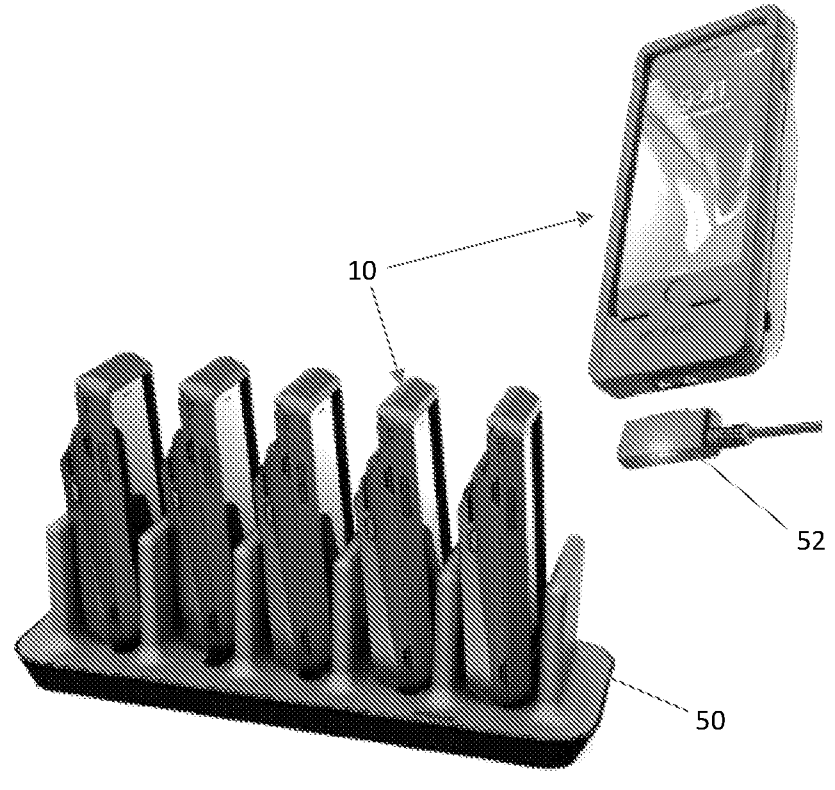
FIG. 7 is a perspective view of a dock for charging a plurality of point of sale systems according to one embodiment.

In some embodiments, the portable electronic device 15 and/or point of sale device 16 is configured to be charged, such as via a dock 50 or electrical cable 52 connected to a power source (see, e.g., FIG. 7). In one embodiment, FIG. 3 shows that shroud 20 of the portable electronic device 15 includes one or more electrical contact(s) 34 for receiving electrical signals via a dock or cable, and that the POS device 16 also includes one or more electrical contact(s) 36 for receiving electrical signals. It is understood that the contacts 34, 36 may be configured to transfer power, data, and/or other signals to or from the portable electronic device 15 and/or the POS device 16. The interior surface of the shrouds 20 of the portable electronic device 15 and/or point of sale device 16 may include a suitable connector 38 (see, e.g., FIG. 6 showing the shroud of the portable electronic device) or electrical contacts (see, e.g., FIG. 5 showing the shroud of the POS device) configured for electrically connecting the electrical contacts 34, 36 to the portable electronic device and/or POS device (e.g., for facilitating power transfer). In some cases, the portable electronic device 15 and associated shroud 20 may serve as a "host" device and be configured to charge both the portable electronic device and the POS device 16 via contacts 34 when the portable electronic device is receiving power and the POS device is attached thereto. In other instances, the portable electronic device 15 and the POS device 16 may be configured to be charged independently of one another, which may allow one to estimate a full charge of each of the devices.

Furthermore, FIG. 4 shows that in some cases, the shroud 20 of the portable electronic device 15 may include one or more electrical contacts 40 and that the shroud of the POS device 16 may include one or more electrical contacts 42. Thus, when the shrouds 20 are in engagement with one another, the contacts 40, 42 are configured to mate with and be electrically connected to one another to facilitate communication between the portable electronic device and the POS device. In the illustrated example, the contacts 40 of the portable electronic device 15 are electrical traces that extend longitudinally along the shroud 20 (e.g., at least ⅓ to ½ of the total length of the shroud). Also in the illustrated example, the contacts 42 of the shroud 20 of the POS device 16 may be spring contacts or the like. However, it is understood that the configuration of the contacts may be reversed in some cases. In some instances, a connector 38 or electrical contacts may be configured to electrically connect the electrical contacts 40, 42 to the portable electronic device and/or POS device.

Thus, in some embodiments, the contacts 40, 42 are configured to maintain an electrical connection with one another as the shrouds 20 are moved relative to one another (e.g., via sliding), thereby ensuring an electrical connection between the portable electronic device 15 and the POS device 16, including between the home and camera positions discussed in conjunction with FIGS. 1-2 above. As such, the portable electronic device 15 and the POS device 16 are configured to maintain communication with one another in the home and camera positions and while the shrouds 20 are moved relative to one another. In this way, a transaction can be completed without losing a connection between the portable electronic device 15 and the POS device 16. In some cases, the contacts 40, 42 provide a USB or hardware-like electrical connection between the portable electronic device 15 and the POS device 16, e.g., via power, data, and ground conductors. Moreover, redundant contacts 40, 42 may be provided in some instances, which may help to maintain a high-speed electrical connection between the portable electronic device and the POS device as the shrouds 20 are slid or otherwise moved relative to one another. Redundant contacts 40, 42 (e.g., ground contacts) may also be provided in some embodiments and act as a switch to prevent live voltage being delivered without a POS device 16 and associated shroud 20 being attached to the portable electronic device 15 and associated shroud.

The foregoing has described one or more embodiments of a POS system, devices, and methods. Those of ordinary skill in the art will understand and appreciate that numerous variations and modifications of the invention may be made without departing from the spirit and scope of the invention. Accordingly, all such variations and modifications are intended to be encompassed by the appended claims.

The invention claimed is:

1. A point of sale system comprising: a portable electronic device; a first shroud configured to be coupled to the portable electronic device; a point of sale device configured to communicate with the portable electronic device; and a second shroud configured to be coupled to the point of sale device, wherein the first shroud is configured to be removably attached to the second shroud to facilitate communication between the portable electronic device and the point of sale device, and wherein the first shroud is configured to move relative to the second shroud while removably attached thereto; wherein each of the first shroud and the second shroud comprises one or more electrical contacts for electrical communication between the portable electronic device and the point of sale device; wherein the portable electronic device and the point of sale device are configured to maintain electrical communication with one another via the one or more electrical contacts when the first shroud is moved relative to the second shroud, wherein the one or more electrical contacts of the first shroud or the second shroud are longitudinally extending electrical traces.

2. The point of sale system of claim 1, wherein the first shroud and/or the second shroud comprises one or more magnets for removably attaching to one another.

3. The point of sale system of claim 1, wherein the point of sale device is configured to communicate data signals with the portable electronic device.

4. The point of sale system of claim 1, wherein the first shroud is configured to be moved relative to the second shroud for exposing a camera of the portable electronic device when the first shroud is removably attached to the second shroud.

5. The point of sale system of claim 1, wherein the first shroud is configured to slide relative to the second shroud while removably attached thereto.

6. The point of sale system of claim 5, wherein the portable electronic device and the point of sale device are configured to be in electrical communication with one another when the first shroud is slid relative to the second shroud.

7. The point of sale system of claim 1, wherein the first shroud is configured to at least partially enclose the portable electronic device.

8. The point of sale system of claim 1, wherein the second shroud is configured to at least partially enclose the point of sale device.

9. The point of sale system of claim 1, wherein the first shroud and/or the second shroud comprises one or more engagement members for removably attaching to one another.

10. The point of sale system of claim 1, wherein the portable electronic device is configured to communicate power signals with the point of sale device when the first shroud is removably attached to the second shroud.

11. The point of sale system of claim 1, wherein the one or more electrical contacts of the first shroud or the second shroud are spring contacts configured to engage the longitudinally extending electrical traces.

12. The point of sale system of claim 1, wherein the first shroud is configured to move relative to the second shroud between a first position where a camera of the portable electronic device is inaccessible and a second position where the camera is accessible while the first and second shrouds are removably attached to and in communication with one another.

13. The point of sale system of claim 1, wherein the portable electronic device and the point of sale device face opposite directions when the first and second shrouds are removably attached to one another.

14. The point of sale system of claim 1, further comprising a plurality of point of sale devices and a plurality of second shrouds, wherein the plurality of point of sale devices are different types than one another, and wherein each of the second shrouds is configured to be removably attached to the first shroud.

15. The point of sale system of claim 1, further comprising a plurality of portable electronic devices and a plurality of first shrouds, wherein the plurality of portable electronic devices are different types than one another, and wherein each of the first shrouds is configured to be removably attached to the second shroud.

16. A point of sale system comprising: a first shroud configured to be coupled to a portable electronic device; and a second shroud configured to be coupled to a point of sale device configured to communicate with the portable electronic device, wherein the first shroud is configured to be removably attached to the second shroud to facilitate communication between the portable electronic device and the point of sale device, and wherein the first shroud is configured to move relative to the second shroud while removably attached thereto; wherein the portable electronic device and the point of sale device are configured to maintain electrical communication with one another via the one or more electrical contacts when the first shroud is moved relative to the second shroud, and wherein the one or more electrical contacts of the first shroud or the second shroud are longitudinally extending electrical traces.

17. The point of sale system of claim 16, further comprising a plurality of second shrouds each configured to be coupled to different types of portable electronic devices, and wherein each of the second shrouds is configured to be removably attached to the first shroud.

18. The point of sale system of claim 16, further comprising a plurality of first shrouds each configured to be coupled to different types of point of sale devices, and wherein each of the first shrouds is configured to be removably attached to the second shroud.

19. A method comprising: coupling a portable electronic device to a first shroud; coupling a second shroud to a point of sale device; removably attaching the first shroud to the second shroud to facilitate communication between the portable electronic device and the point of sale device; and moving the first shroud relative to the second shroud while removably attached to one another; wherein moving comprises sliding the first shroud relative to the second shroud; wherein the portable electronic device and the point of sale device are configured to maintain electrical communication with one another via the one or more electrical contacts when the first shroud is moved relative to the second shroud, and wherein the one or more electrical contacts of the first shroud or the second shroud are longitudinally extending electrical traces.

20. The method of claim 19, wherein moving comprises sliding the first shroud relative to the second shroud.

21. The method of claim 19, wherein moving comprises moving the first shroud between a first position where a camera of the portable electronic device is inaccessible and a second position where the camera is accessible while the first and second shrouds are removably attached to one another.

* * * * *